United States Patent [19]

Benjamin

[11] Patent Number: 4,478,103
[45] Date of Patent: Oct. 23, 1984

[54] WORM GEAR MECHANISM

[75] Inventor: James M. Benjamin, Indianapolis, Ind.

[73] Assignee: AT&T Bell Laboratories, Murray Hill, N.J.

[21] Appl. No.: 266,442

[22] Filed: May 22, 1981

[51] Int. Cl.³ .......................... F16H 1/16; F16H 1/20; F16H 1/18; F16H 27/02

[52] U.S. Cl. ....................................... 74/425; 74/457; 74/458; 74/424.8 R; 74/424.5; 74/424.6; 74/89.14; 74/89.15

[58] Field of Search ................. 74/425, 426, 396, 457, 74/458, 89.14, 89.15, 416, 20, 437, 434, 424.5, 424.6, 424.8 R

[56] References Cited

U.S. PATENT DOCUMENTS

| | | | |
|---|---|---|---|
| 2,453,656 | 11/1948 | Bullard | 74/109 |
| 2,512,696 | 5/1946 | Tappert | 74/435 |
| 2,625,218 | 1/1953 | Nihon | 74/425 |
| 2,666,334 | 1/1954 | Nalle | 74/424.8 R |
| 3,572,140 | 3/1971 | Gulick | 74/89.15 |
| 3,824,420 | 7/1974 | Stegeman et al. | 74/424.8 R |
| 3,851,537 | 12/1974 | Nickstadt | 74/404 |

FOREIGN PATENT DOCUMENTS

| | | | |
|---|---|---|---|
| 2109818 | 9/1971 | Fed. Rep. of Germany | 74/89.15 |
| 1164076 | 10/1958 | France | 74/425 |
| 1259413 | 12/1961 | France | 74/425 |

*Primary Examiner*—Lawrence J. Staab
*Assistant Examiner*—Michael D. Bednarek
*Attorney, Agent, or Firm*—W. H. Kamstra; P. Visserman

[57] ABSTRACT

A worm (10) and worm gear (12) mechanism in which the gear (12), in addition to its gear teeth (20), also has a helical thread (22) formed thereon. The helical thread (11) of the worm (10) conventionally meshes with the gear teeth (20) of the worm gear (12), rotation of the worm (10) causing a corresponding rotation of the gear (12). The gear (12) is fitted in a threaded hole (21) so that, as it is rotated by the worm (10), it is also caused to move along its longitudinal axis within the hole (21).

15 Claims, 3 Drawing Figures

WORM GEAR MECHANISM

TECHNICAL FIELD

This invention relates to mechanical gearing arrangements and particularly to worm and worm gear drives.

BACKGROUND OF THE INVENTION

Worm and worm gear arrangements have long been universally known as advantageous drive mechanisms for unilaterally transferring power and motion from one rotating gear element to another. Very simply, the mechanism comprises a worm and a worm gear, the worm having a helical thread which meshes with the teeth of the worm gear, the axes of the two elements lying at substantially right angles. Conventionally, rotation of the worm causes a corresponding rotation of the gear, neither of the elements being movable along its axis. Uses of the worm and worm gear mechanism have been as old and as broad as the mechanical arts themselves and are too numerous to list. One field in which the mechanism has proved exceptionally useful and with which the worm and worm gear arrangement of the invention is particularly concerned is that of measurement, adjustment, positioning, and the like. Because of the high degree of precision required, very fine-pitch worms and gears are there employed for the transmission of uniform angular rotation rather than power. In each of such prior art arrangements, the rotating worm transmits only a corresponding rotation to the worm gear, the latter being conventionally fixed against lateral movement along its axis as mentioned. An objective of the present invention is a new and novel worm and worm gear mechanism of general utility in which the rotation of the worm imparts to the worm gear not only a corresponding rotation but also a precise displacement of the worm gear along its axis.

SUMMARY OF THE INVENTION

The foregoing and other objectives are realized in one illustrative worm and worm gear mechanism according to the invention comprising a worm having a helical thread formed thereon mounted for rotation about its longitudinal axis and a worm gear having teeth meshing with the helical thread of the worm. The axes of the gear and worm lie at substantially right angles, the worm being mounted so as to prevent lateral movement along its axis. According to one feature of the mechanism, the worm gear is formed substantially cylindrically shaped and is mounted for rotation in a cylindrical hole having helical threads formed on its inner surface. The latter threads mesh with corresponding helical threads cut across the worm gear teeth. When the worm is rotated, it conventionally causes a corresponding rotation of the cylindrical worm gear. As a departure from conventional worm and gear mechanisms, however, the rotation of the cylindrical worm gear also causes its movement along its axis much as a rotated screw in a threaded hole.

BRIEF DESCRIPTION OF THE DRAWING

The organization and operation of a worm and worm gear mechanism according to the invention together with its features will be better understood from a consideration of the detailed description of one illustrative embodiment thereof which follows when taken into conjunction with the accompanying drawing in which.

DETAILED DESCRIPTION

Figure 1:
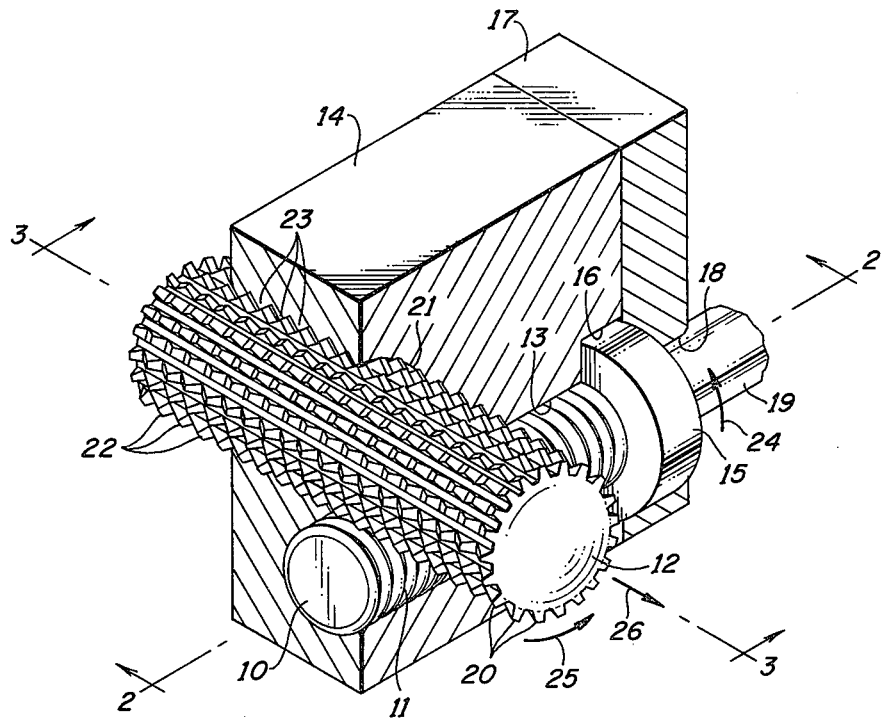
FIG. 1 is a perspective, partial sectional view of a worm and worm gear mechanism according to the invention.
Figure 2:
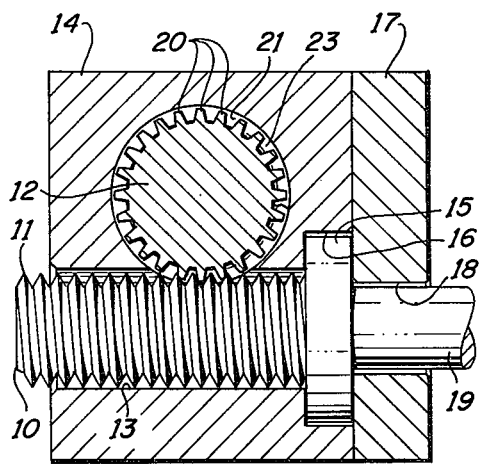
FIG. 2 is a cross-sectional view of the mechanism of FIG. 1 taken along the line 2—2.

An illustrative mechanism according to the invention is shown in FIGS. 1 and 2 as comprising a worm 10 having a helical thread 11 formed thereon and a cylindrical worm gear 12, the longitudinal axes of elements 10 and 12 lying at substantially right angles. Worm 10 is freely fitted for rotation in a cylindrical hole 13 formed in a mounting member 14. Worm 10 is prevented from lateral movement along its axis by an annular collar 15 rotatably fitted in a circular recess 16 formed on a face of member 14 and a retaining plate 17. Plate 17, which may be affixed to member 14 in any convenient manner, has a hole at 18 to rotatably admit a shaft extension 19 of worm 10. Although extension 19 is shown unterminated, it will be appreciated that in practice extension 19 may be fitted with a manually operated finger wheel or may be connected to a machine drive, for example, as dictated only by the context in which the mechanism is put to use.

Figure 3:
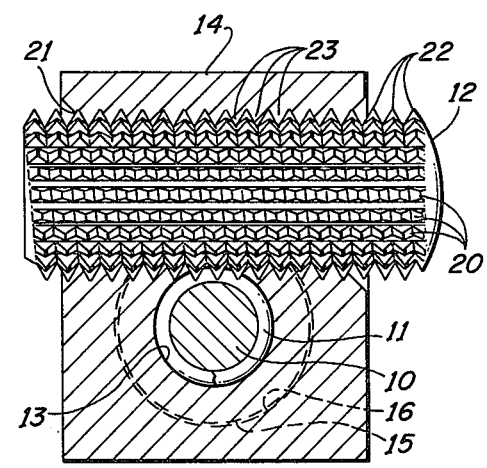
FIG. 3 is a cross-sectional view of the mechanism of FIG. 1 taken along the line 3—3.

Cylindrical worm gear 12 has a plurality of spur teeth 20 formed on its surface parallel to its longitudinal axis, which teeth are dimensioned and spaced to mesh with helical thread 11 of worm 10. Gear 12 is rotatably fitted in a cylindrical hole 21 formed in member 14 transverse to hole 13 and has cut across its teeth 20 a helical thread 22 (FIG. 3). The latter thread is dimensioned and spaced to mesh with a corresponding thread 23 circularly formed on the inner surface of hole 21. Except for the engagement of threads 22 and 23, gear 12 is unrestrained in movement along its longitudinal axis as may be required for a particular use.

In the operation of the mechanism of the invention, the rotation of worm 10 conventionally causes a corresponding rotation of cylindrical worm gear 12 as the result of the engagement of helical thread 11 and spur teeth 20. A rotation of worm 10 in the direction, for example, as indicated by arrow 24 in FIG. 1 causes gear 12 to rotate in the direction indicated by arrow 25. As a departure from the operation of known worm and worm gear mechanisms, the rotation as described of cylindrical worm gear 12 also causes its movement along its longitudinal axis in the direction as indicated by arrow 26 as the result of the engagement of helical threads 22 and 23. Although not shown in the drawing, cylindrical worm gear 12 may advantageously be adapted to control devices and other mechanisms requiring extremely fine adjustments and high precision. In practice, for example, a mechanism having a cylindrical worm gear of 0.3125 inch outside diameter having 32 teeth each having side walls at 60 degrees, a face of 0.0039 inch and a depth of 0.0192 inch and further having 40 helical threads per inch, was driven along its axis precisely 0.0008 inch by one rotation of a worm of 0.190 inch outside diameter having 32 helical threads per inch.

What has been described is considered to be only one illustrative worm and worm gear mechanism according to the principles of the invention and it is to be understood that various and numerous other arrangements may be devised by one skilled in the art without departing from the spirit and scope of the invention as defined only by the accompanying claims.

What is claimed is:

1. A worm and worm gear mechanism comprising a worm element fixedly mounted along and rotatable about its longitudinal axis, said worm element having a helical thread formed thereon, a gear element having gear teeth meshing with said helical thread and also having a helical thread formed thereon, said gear element having its axis at an angle with said axis of said worm element, and fixed engagement means for engaging said helical thread of said gear element whereby movement along its axis is caused when said gear element is rotated.

2. A worm and worm gear mechanism as claimed in claim 1 in which said angle is substantially 90 degrees.

3. A worm and worm gear mechanism comprising a worm element fixedly mounted along and rotatable about its longitudinal axis, said worm element having a helical thread formed thereon, a gear element having gear teeth meshing with said helical thread and also having a helical thread formed thereon, said gear element having its axis at an angle with said axis of said worm element, and engagement means comprising a member having a cylindrical hole having a helical thread formed therein for engaging said helical thread of said gear element whereby movement along its axis is caused when said gear element is rotated.

4. A worm and worm gear mechanism comprising a mounting member having a first hole and a second hole opening on said first hole and lying substantially transverse thereto, a worm element fixedly mounted along and rotatable about its longitudinal axis fitted in said first hole, said worm element having a helical thread formed thereon, a gear element fitted in said second hole having gear teeth extending into said first hole meshing with said helical thread of said worm element, said gear element also having a helical thread formed thereon, and engagement means in said second hole for engaging said helical thread of said gear element.

5. A worm and worm gear mechanism comprising a mounting member having a first hole and a second hole opening on said first hole and lying substantially transverse thereto, a worm element fixedly mounted along and rotatable about its longitudinal axis fitted in said first hole, said worm element having a helical thread formed thereon, a gear element fitted in said second hole having gear teeth extending into said first hole meshing with said helical thread of said worm element, said gear element also having a helical thread formed thereon, and engagement means in said second hole comprising a helical thread formed in said second hole for engaging said helical thread of said gear element.

6. A worm gear mechanism comprising a first and a second worm element having substantially transverse axes, each of said elements having a helical thread formed thereon, said second element also having gear teeth formed thereon meshing with said helical thread of said first element, and fixed engagement means comprising a helical member meshing about said helical thread of said second element for engaging said helical thread of said second element.

7. A worm gear mechanism as claimed in claim 5 also comprising mounting means having a cylindrical hole, said helical member comprising a helical thread formed in the inner surface of said hole.

8. A drive mechanism comprising a member having a threaded hole, a first threaded worm element in said hole movable along its axis as said first element is rotated, and means for rotating said first element comprising gear teeth grooves formed on said first element parallel to its axis and superimposed on the threads of said first worm element and a second threaded worm element meshing with said gear teeth grooves, said second element having an axis at an angle with the axis of said first element.

9. A worm and worm gear mechanism comprising a worm element fixedly mounted along and rotatable about its longitudinal axis, said worm element having a helical thread formed thereon, a gear element having gear teeth meshing with said helical thread and also having a helical thread superimposed on said gear teeth, said gear element having its axis at an angle with said axis of said worm element, and fixed engagement means for engaging said helical thread of said gear element whereby movement along its axis is caused when said gear element is rotated.

10. A worm and worm gear mechanism as claimed in claim 9 in which said angle is substantially 90 degrees.

11. A worm and worm gear mechanism as claimed in claim 9 in which said engagement means comprises a member having a cylindrical hole having a helical thread formed therein for engaging said helical thread of said gear element.

12. A worm and worm gear mechanism comprising a mounting member having a first hole and a second hole opening on said first hole and lying substantially transverse thereto, a worm element fixedly mounted along and rotatable about its longitudinal axis fitted in said first hole, said worm element having a helical thread formed thereon, a gear element fitted in said second hole having gear teeth extending into said first hole meshing with said helical thread of said worm element, said gear element also having a helical thread superimposed on said gear teeth, and engagement means in said second hole for engaging said helical thread of said gear element.

13. A worm and worm gear mechanism as claimed in claim 12 in which said engagement means comprises a helical thread formed in said second hole for engaging said helical thread of said gear element.

14. A worm gear mechanism comprising a first and a second worm element having substantially transverse axes, said first element having a helical thread formed thereon, said second element having gear teeth formed thereon meshing with said helical thread of said first element and a helical thread superimposed on said gear teeth, and fixed engagement means comprising a helical member meshing about said helical thread of said second element for engaging said helical thread of said second element.

15. A worm gear mechanism as claimed in claim 14 also comprising mounting means having a cylindrical hole, said helical member comprising a helical thread form in the inner surface of said hole.

* * * * *

UNITED STATES PATENT AND TRADEMARK OFFICE
CERTIFICATE OF CORRECTION

PATENT NO.  : 4,478,103
DATED       : October 23, 1984
INVENTOR(S) : James M. Benjamin It is certified that error appears in the above-identified patent and that said Letters Patent is hereby corrected as shown below:

In the claims, Column 4, line 63, "form" should be --formed--.

Signed and Sealed this

Ninth Day of July 1985

[SEAL]

*Attest:*

DONALD J. QUIGG

*Attesting Officer*  *Acting Commissioner of Patents and Trademarks*